(12) United States Patent
Sade et al.

(10) Patent No.: US 10,250,609 B2
(45) Date of Patent: **\*Apr. 2, 2019**

(54) PRIVILEGED ACCESS TO TARGET SERVICES

(71) Applicant: CyberArk Software Ltd., Petach-Tikva (IL)

(72) Inventors: Yair Sade, Herzlia (IL); Andrey Dulkin, Herzlia (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,344

(22) Filed: Sep. 26, 2018

(65) Prior Publication Data

US 2019/0028477 A1 Jan. 24, 2019

Related U.S. Application Data

(63) Continuation of application No. 14/698,956, filed on Apr. 29, 2015, now Pat. No. 10,116,658.

(51) Int. Cl.
*H04L 29/06* (2006.01)
(52) U.S. Cl.
CPC .......... *H04L 63/10* (2013.01); *H04L 63/0807* (2013.01); *H04L 63/062* (2013.01)
(58) Field of Classification Search
CPC ..................................................... H04L 63/10
See application file for complete search history.

(56) References Cited

U.S. PATENT DOCUMENTS

| 7,010,573 B1* | 3/2006 | Saulpaugh .............. H04L 63/08 709/206 |
| 7,174,383 B1* | 2/2007 | Biswas ............... H04L 63/0815 709/229 |
| 7,200,848 B1* | 4/2007 | Slaughter .............. H04L 63/101 709/202 |

(Continued)

OTHER PUBLICATIONS

Microsoft, "How the Kerberos Version 5 Authentication Protocol Works: Logon and Authentication", Microsoft, p. 1-42, Updated Oct. 7, 2009.

(Continued)

*Primary Examiner* — William S Powers
(74) *Attorney, Agent, or Firm* — Finnegan, Henderson, Farabow, Garrett & Dunner LLP

(57) ABSTRACT

A method of providing a client with a privileged access ticket (PAT) to access a target service is performed at a credentials management service (CMS) in communication with a client and an authentication service. The CMS receives a privileged access ticket request from the client. The PAT request uses authentication credentials. The CMS retrieves privileged credentials using the authentication credentials, and sends a PAT request to the authentication service using the privileged credentials. When the PAT is received, the CMS forwards the PAT to the client. Optionally, in order to acquire a PAT the CMS sends a privileged provisioning ticket (PPT) request using the privileged credentials to the authentication service, and, after the PPT is received, requests the PAT from the authentication service using the PPT.

20 Claims, 8 Drawing Sheets

(56) References Cited

U.S. PATENT DOCUMENTS

| | | | | |
|---|---|---|---|---|
| 7,356,601 B1* | 4/2008 | Clymer | ............... | H04L 63/0272 709/223 |
| 8,505,078 B2* | 8/2013 | Hohlfeld | ............. | G06F 21/6218 726/27 |
| 2012/0079368 A1* | 3/2012 | Abdelaziz | ............... | G06F 9/465 715/234 |
| 2015/0200821 A1* | 7/2015 | Sade | ....................... | H04L 67/28 709/224 |

OTHER PUBLICATIONS

Wikipedia, "Security Assertion Markup Language", Wikipedia, the Free Encyclopedia, 11 P., Last Modified Apr. 7, 2015.

\* cited by examiner

PRIVILEGED ACCESS TO TARGET SERVICES

This application is a continuation of U.S. patent application Ser. No. 14/698,956, filed on Apr. 29, 2015, titled "Privileged Access to Target Services," the entire contents of which are incorporated herein by reference.

BACKGROUND

The present invention, in some embodiments thereof, relates to enabling privileged client access to a target service, and, more specifically, but not exclusively, to enabling privileged client access to a target service in a Kerberos-enabled network.

The Kerberos protocol is well known and widely used for authentication in computer networks. Kerberos is aimed at a client-server model, and operates on the basis of 'tickets' which allow nodes communicating over a non-secure network to authenticate their identity to one another in a secure manner.

Kerberos authentication usually employs three parties—client, target service (also referred to as "principal" in Kerberos documentation) and a third party which enables the target service and, optionally the client, to authenticate each other. In Kerberos, the third party usually combines the functionalities of an Authentication Service (AS), a Key Distribution Center (KDC) and a Ticket-Granting Service (TGS).

Reference is now made to FIG. 1, which is a simplified diagram of the three-step Kerberos authentication process. Kerberos system 102 includes the functionalities of AS 102.1, KDC 102.2 and TGS 102.3.

A) Authentication Service Exchange—client 101 authenticates itself to AS 102.1, which forwards the username to KDC 102.2. KDC 102.2 then issues a Ticket Granting Ticket (TGT) to client 101. This step includes two main transactions:
  i) KRB_AS_REQ—client 101 authenticates to the AS 102.1; and
  ii) KRB_AS_REP—KDC 102.2 provides a TGT to client 101.

B) Ticket-Granting Service (TGS) Exchange—client 101 requests KDC 102.2 to provide a service ticket (ST) for a specific target service. The client authenticates itself to the TGS with the TGT and receives the requested ST. This step includes two main transactions:
  i) KRB_TGS_REQ—client 101 provides the TGT to TGS 102.3 and requests an ST; and
  ii) KRB_TGS_REP—TGS 102.3 provides an ST to client 101.

C) Client/Server (CS) Exchange—client 101 sends the ST to target service 103 and target service 103 grants access. Two main steps are:
  i) KRB_AP_REQ—client 101 sends the access request, including the ST, to target service 103; and
  ii) KRB_AP_REP—used for authenticating target service 103 to client 101 (optional).

In summary, client 101 provides authentication credentials to Kerberos system 103 and after a multi-step interaction receives an ST from Kerberos system 103. The ST authenticates client 101 to target service 103, thereby enabling client 101 to access the target service. One disadvantage of the Kerberos system is that the client machines are vulnerable to attackers who may hijack the client credentials and thus gain access to the target system.

SUMMARY

In embodiments described herein a credentials management system (CMS) serves as an additional party during Kerberos-style authentication performed by an authentication service. The CMS serves as an intermediary between the client and the authentication service. During interaction with the authentication service, the CMS uses privileged credentials which are acquired by the CMS using authentication credentials provided by the client. The privileged credentials are not provided to the client and/or user, which eliminates the risk that they will be obtained by attackers targeting the client endpoint.

In order to acquire a privileged access ticket (also denoted herein a PAT) which enables the client to access a target service, the client sends a request to the CMS. The request uses authentication credentials. Based on the authentication credentials and/or request parameters, the CMS identifies the target service for which the PAT is requested and which privileged credential set to use. The CMS then retrieves the privileged credential set, and requests a PAT from the authentication service. The request for a PAT (also denoted herein as a PAT request) uses the privileged credentials.

The CMS forwards the PAT received from the authentication service to the client. After receiving the PAT, the client is able to access the target service.

Optionally the client request includes the authentication credentials.

Optionally, the PAT request includes the privileged credentials.

Optionally, the client request identifies the target service for which the client requests the PAT and/or the privileged credentials to be used for issuing the PAT. Alternately or additionally, the CMS includes logic denoting which target service the client needs to access. The logic may be activated on the authentication credentials used by the client and/or request parameters, such as IP or time.

Optionally, in order to obtain a PAT, the CMS first acquires a privileged provisioning ticket (also denoted herein a PPT). Once a PPT is acquired by the CMS, the CMS requests a PAT from the authentication service using the PPT. Optionally, the request for a PPT includes the privileged credentials.

As used herein, the term "authentication service" includes at least functionality for providing a privileged access ticket. Optionally the authentication service further includes functionality for providing a privileged provisioning ticket, substantially similar to the total functionality of the Kerberos AS, KDC and TGS.

In some embodiments described herein Kerberos terms are used to describe the system elements and commands. These terms are used for illustrative purposes and are not intended to limit the embodiments necessarily to Kerberos-specific implementation.

According to an aspect of some embodiments of the present invention there is provided a method of providing a client with a privileged access ticket to access a target service. The method is performed at a credentials management service (CMS) in communication with a client and an authentication service, and includes:
  i) Receiving a request from the client for a privileged access ticket required to access a target service running on a target network node. The request for the privileged access ticket uses authentication credentials;

ii) Retrieving, based on at least one of the authentication credentials and the request for the privileged access ticket, privileged credentials for authenticating to the authentication service;

iii) Acquiring, using the privileged credentials, the privileged access ticket from the authentication service. The privileged access ticket enables the client to access the target service; and iv) Forwarding the privileged access ticket to the client.

According to some embodiments of the invention, the request for the privileged access ticket includes the authentication credentials.

According to some embodiments of the invention, the method further includes identifying the target service and the privileged credentials based on at least one of: authentication credentials, information included in the request for the privileged access ticket, parameters of the request for the privileged access ticket, logic on the CMS and preconfigured parameters on the CMS.

According to some embodiments of the invention, acquiring the privileged access ticket includes: requesting the privileged access ticket from the authentication service using the privileged credentials, and receiving the requested privileged access ticket from the authentication service.

According to some embodiments of the invention, the privileged access ticket is an access token.

According to some embodiments of the invention, acquiring the privileged access ticket includes: acquiring a privileged provisioning ticket from the authentication service using the privileged credentials, and acquiring the privileged access ticket from the authentication service using the privileged provisioning ticket.

According to some embodiments of the invention, acquiring the privileged provisioning ticket includes: sending a request for the privileged provisioning ticket to the authentication service and receiving the requested privileged provisioning ticket from the authentication service. The request for the privileged provisioning ticket uses the privileged credentials.

According to some embodiments of the invention, acquiring the privileged access ticket includes: requesting the privileged access ticket from the authentication service using the privileged provisioning ticket, and receiving the requested privileged access ticket from the authentication service.

According to some embodiments of the invention, the authentication service operates with a Kerberos protocol, the privileged provisioning ticket is a Kerberos ticket granting ticket (TGT) and the privileged access ticket is a Kerberos service ticket (ST).

According to some embodiments of the invention, the CMS forwards the privileged access ticket to a specified network address. According to some embodiments of the invention, the specified network address is an address of the client requesting the privileged access ticket. According to alternate or additional embodiments of the invention, the specified network address differs from an address of the client requesting the privileged access ticket.

According to some embodiments of the invention, the privileged provisioning ticket is valid only for a CMS residing at a specified network address.

According to some embodiments of the invention, the method further includes: at the CMS, authenticating the client using the authentication credentials prior to acquiring the privileged provisioning ticket.

According to some embodiments of the invention, the method further includes: at the CMS, authenticating the client using the authentication credentials prior to acquiring the privileged access ticket.

According to some embodiments of the invention, the method further includes: at the CMS, determining, using the authentication credentials, an authorization of the client to access the target service. The CMS acquires the privileged access ticket only for authorized target services.

According to some embodiments of the invention, the method further includes: at the CMS, determining, using the authentication credentials, an authorization of the client to request a privileged access ticket acquired using the privileged credentials. The CMS acquires the privileged access ticket only for privileged credentials authorized for request by the client.

According to some embodiments of the invention, the request to access a target service specifies preferred privileged credentials to be used by the CMS for obtaining the privileged provisioning ticket.

According to some embodiments of the invention, the request to access a target service specifies preferred privileged credentials to be used by the CMS for obtaining the privileged access ticket.

According to some embodiments of the invention, authentication between the client and the CMS uses a first authentication scheme, and authentication between the CMS and the authentication service uses a second authentication scheme, and the first authentication scheme differs from the second authentication scheme.

According to some embodiments of the invention, the method further includes forwarding the privileged provisioning ticket to the client. According to some embodiments of the invention, the privileged provisioning ticket enables the client to obtain a privileged access ticket directly from the authentication service.

According to some embodiments of the invention, the request to access a target service specifies an address of the target service with a first address protocol, and acquiring the privileged access ticket includes: at the CMS, translating the address of the target service to a second address protocol. The target service is identified to the authentication service in the second address protocol.

According to an aspect of some embodiments of the present invention there is provided a credentials management system (CMS) which includes:

i) A hardware processor;

ii) A request management module, in communication with the hardware processor, which receives a request from a client for a privileged access ticket required to access a target service running on a target network node. The request for the privileged access ticket uses authentication credentials;

iii) A credentials module, in communication with the hardware processor and the request management module, which retrieves, based on at least one of the authentication credentials and the request for a privileged access ticket, privileged credentials for authenticating to an authentication service; and iv) A privileged access ticket module, in communication with the hardware processor, the credentials module and the request management module, which uses the privileged credentials to acquire the privileged access ticket from the authentication service and forwards the privileged access ticket to the client. The privileged access ticket enables the client to access the target service.

According to some embodiments of the invention, the request management module identifies the target service and the privileged credentials based on at least one of: authentication credentials, information included in the request for the privileged access ticket, parameters of the request for the privileged access ticket, logic on the credentials management system and preconfigured parameters on the credentials management system.

According to some embodiments of the invention, the CMS further includes a privileged provisioning ticket module which uses the privileged credentials to acquire a privileged provisioning ticket from the authentication service. The access ticket module then acquires the privileged access ticket by: requesting the privileged access ticket from the authentication service using the privileged provisioning ticket and receiving the requested privileged access ticket from the authentication service.

According to some embodiments of the invention, the CMS further includes at least one of:

i) An authentication module which uses the authentication credentials to authenticate the client;

ii) An authorization module which uses the authentication credentials to determine at least one of: an authorization of the client to access the target service and an authorization of the client to request a privileged access ticket acquired using the privileged credentials; and iii) A monitoring module which audits client activity on the credentials management system.

According to some embodiments of the invention, the credentials management system resides on one of:

i) a server communicating over a communication network with an endpoint on which the client resides;

ii) an endpoint machine on which the client resides; and iii) a server hosting the authentication service.

According to an aspect of some embodiments of the present invention there is provided a computer program product for providing a client with a privileged access ticket to access a target service. The computer program product includes:

i) a computer readable storage medium;

ii) first program instructions to receive, at a credentials management service (CMS) in communication with a client and an authentication service, a request from the client for a privileged access ticket required to access a target service running on a target network node. The request for the privileged access ticket uses authentication credentials;

iii) second program instructions to retrieve, by the CMS using the authentication credentials, privileged credentials for authenticating to the authentication service;

iv) third program instructions to acquire, by the CMS using the privileged credentials, a privileged access ticket. The privileged access ticket enables the client to access the target service; and v) fourth program instructions to forward, from the CMS, the privileged access ticket to the client.

The first, second, third and fourth program instructions are stored on the computer readable storage medium.

According to some embodiments of the invention, the computer program product further includes fifth program instructions to acquire, by the CMS using the privileged credentials, a privileged provisioning ticket from the authentication service. The fifth program instructions are stored on the computer readable storage medium.

According to some embodiments of the invention, the fourth program instructions include instructions to:

i) Send a request for the privileged access ticket to the authentication service. The request for the privileged access ticket uses the privileged provisioning ticket; and ii) Receive the requested privileged access ticket from the authentication service.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
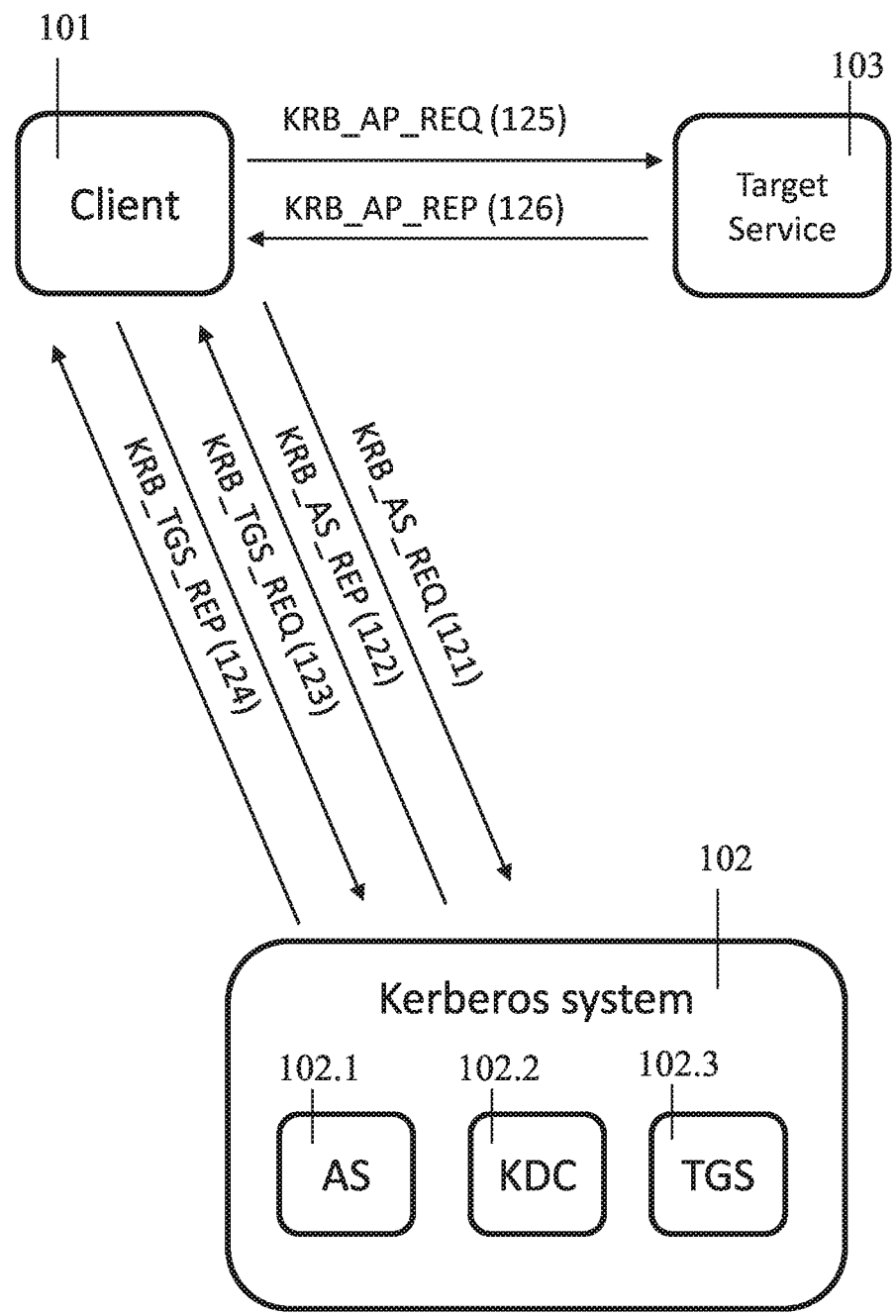
FIG. 1 is a simplified diagram of the three step process of the Kerberos authentication.

The present invention, in some embodiments thereof, relates to enabling privileged client access to a target service, and, more specifically, but not exclusively, to enabling privileged client access to a target service in a Kerberos-enabled network.

Embodiments herein present a credential management system and method which enables a client to obtain privileged access to a target service without being in possession of privileged credentials. The client uses authentication credentials to authenticate to a credential management system (CMS). The CMS uses the authentication credentials to authenticate the client and to retrieve the privileged credentials. The CMS uses the privileged credentials to perform the necessary authentication steps with the authentication service. The CMS then receives the PAT from the authentication service and forwards it to the client.

For the client, the CMS is the system element which provides the PAT in response to a request for a PAT to a specific target service. The client request uses authentication credentials. For the authentication service, the CMS is the system element to which the privileged provisioning ticket and/or privileged access ticket are provided in response to requests based on privileged credentials. Thus the full Kerberos-style authentication process may be accomplished without the client having access to the privileged credentials.

As used herein the term "client" means an element running on a user endpoint (such as a terminal or personal computer) which requests a privileged access ticket to a target service. Optionally a client includes a user interface which enables a human user to initiate the request and/or utilize the target service when a PAT is obtained. Optionally, a client is an application which requests access to a target service independently (without receiving a request from a human user). Optionally, a client is a component of the operating system or user endpoint that requests the privileged access without specific user interaction with the component.

As used herein the term "target service" means a resource, access to which is requested by a client. The term "target service" includes applications, systems, servers and other machines, which may reside on an endpoint or be accessible over a communication network. The term "target service" is intended to encompass resources which are on-premise (e.g. within an organizational network), on a local server, on a remote server, in the Cloud or on other types of system node.

As used herein, the terms "credentials", "credential set" and "set of credentials" mean any type of information that may be used for authentication. A credential set may include one or more of: an account name and password, SSH keys, certificates, biometric information, access tokens, one-time passwords and any other type of credentials which may be used for accessing system resources and/or accessing services and/or for authentication.

As used herein, the term "authentication credentials" means credentials which are held by the user and/or client but do not enable the client to gain privileged access to the target service directly. The authentication credentials are used to authenticate the user and/or client to the CMS.

As used herein, the term "privileged credentials" means credentials which are used by the CMS to authenticate to an authentication service in order to acquire a privileged access ticket and/or privileged provisioning ticket.

As used herein, the term "privileged access" means an access that grants different, typically higher, operation permissions than those granted to the authentication credentials. For example, a user using the personal "John" account in a Windows network may require privileged access to a target server to perform a maintenance task. As the "John" account does not have the required permission on the target server to perform the task, the user may need to gain privileged access as an administrator account (e.g. "Domain_Admin_1") which does have the required permissions on the target server. In this way a user account may have the permissions to only a limited set of tasks, while the separate privileged account is used for more privileged tasks (e.g. the "least privileged" principle).

As used herein the terms "privileged access ticket" and "PAT" mean an authenticator which is acquired by the CMS using privileged credentials and which may be used by the client to gain privileged access to the target service. The PAT may also refer to a privileged authentication or access token, such as those employed in the SAML (Security Assertion Markup Language) protocol or other known security standards where the user needs to provide a token to authenticate or gain access to a target service.

As used herein the term "privileged provisioning ticket" means an authenticator which may be used by the CMS to acquire a PAT from an authentication service.

Authentication is the process of confirming an identity. In communication networks and applications, identities are usually associated with accounts, and parties use credentials to authenticate in the network and to target services, so as to be able to use the account and the access and operating permissions associated with that account.

As used herein, the terms "uses authentication credentials" and substantially similar terms mean authenticating as the account for which the authentication credentials are valid. For example, if the authentication credentials are username and password, and the client and the CMS are in a Windows domain managed by an Active Directory which uses the Kerberos authentication protocol, then the term "uses authentication credentials" may mean retrieving a Service Ticket from the Active Directory to access the CMS and sending the retrieved Service Ticket to the CMS. This process enables the CMS to authenticate the client. It is a common practice in modern authentication schemes not to send the actual credentials in order to avoid various attacks, such as Man-in-the-Middle, but instead to use challenge-response schemes, a central authority or other schemes.

As used herein, the terms "uses privileged credentials" and substantially similar terms mean authenticating as the account for which the privileged credentials are valid.

It is noted that the term "uses" credentials is not limiting to the case in which credentials are not transmitted. The term "uses" optionally includes transmitting the credentials in those cases wherein the credentials are in fact provided to the authentication service (e.g. the Windows Digest authentication scheme).

As used herein the term "based on the authentication credentials and/or request parameters" means applying a specified logic to the authentication credentials and/or request parameters to identify the target service and to determine which privileged credentials should be used. For example, the CMS may include logic that specifies the target that a PAT should be acquired for from the authentication service, for each set of authentication credentials. Alternately or additionally, the CMS may include logic that determines, for a specific set of request parameters, which privileged credentials should be retrieved to issue the PAT.

As used herein the term "based on privileged credentials" means applying a specified logic to the privileged credentials to determine what PAT and/or PPT should be issued.

As used herein the terms "acquires" and "acquiring" mean requesting and receiving a specified item.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or to other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Acquiring a PAT Using Privileged Credentials

Figure 2A:
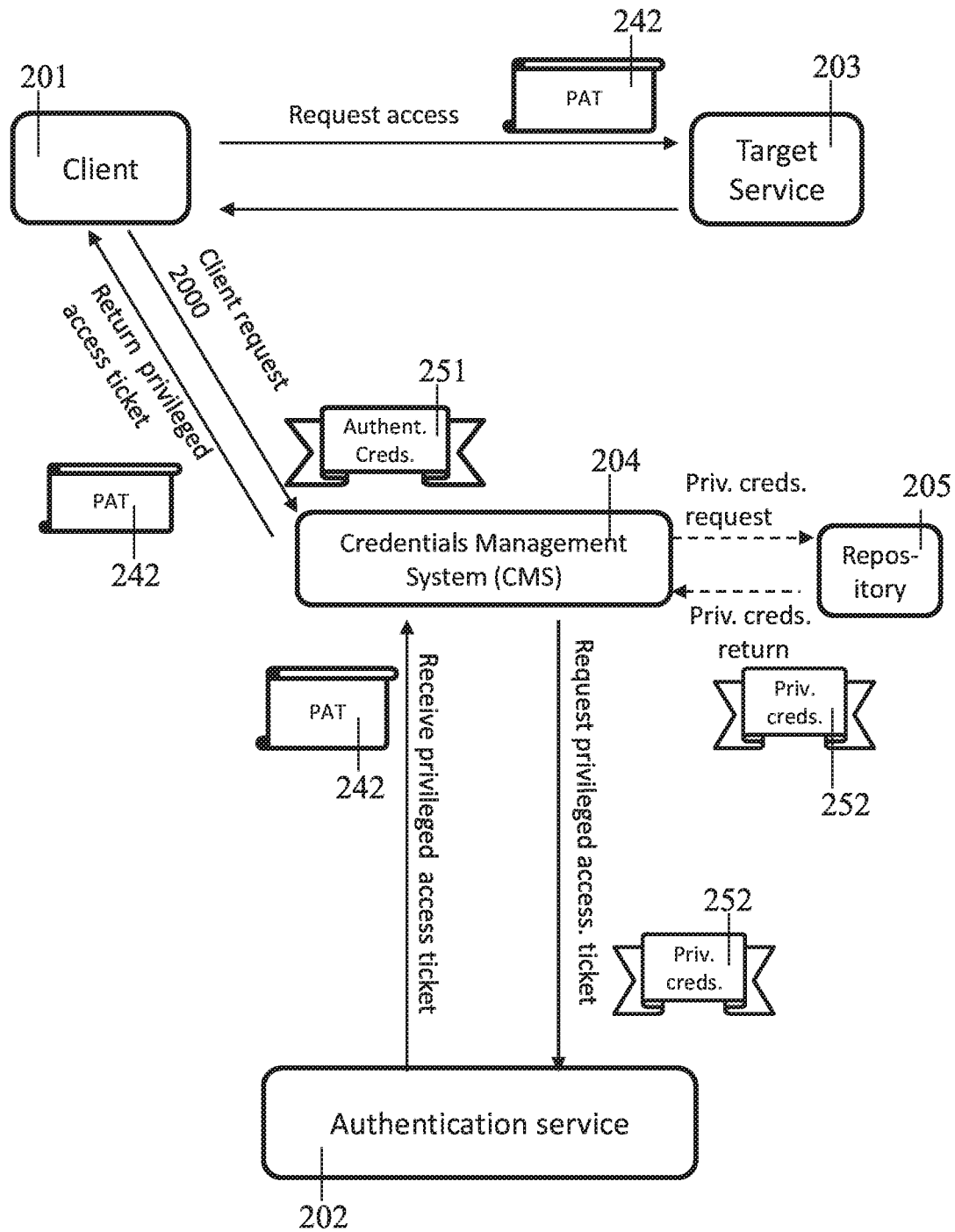
FIG. 2A is a first simplified diagram of a client obtaining a privileged access ticket to a target service using a credentials management system, according to embodiments of the invention.

Reference is now made to FIG. 2A, which is a first simplified diagram of a client obtaining a PAT to a target service using a credentials management system, according to embodiments of the invention.

CMS 204 serves as an intermediate between client 201 and authentication service 202.

For clarity, the following describes the non-limiting embodiment in which access to the target service requires privileged credentials not in possession of client 201. Other embodiments are envisioned where access to some target services is not privileged, and the authentication credentials possessed by client 201 are sufficient for accessing a desired target service. In such cases, client 201 may obtain a non-privileged access ticket directly from authentication service 202 without involving CMS 204.

In order to access target service 203, client 201 requests a PAT from CMS 204 and provides authentication credentials 251. CMS 204 uses authentication credentials 251 to retrieve privileged credentials 252. Privileged credentials 252 may be obtained by CMS 204 by any means known in the art, as described in more detail below.

Optionally, the client request (2000) for a privileged access ticket does not specify that accessing the target service requires privileged credentials. In fact, the client (and/or user) may be unaware that access to target service 203 is privileged access which requires privileged credentials.

The term "client requests a privileged access ticket" (and substantially similar terms) is intended to encompass a client request for an access ticket, regardless of whether or not the client request specifies that the access ticket is for privileged access to the target service.

Optionally, authentication credentials 251 specify or otherwise indicate the privileged credentials to be used by CMS 204 for acquiring the PPT and/or PAT. This may be helpful in cases where a given user or client is associated with more than one set of privileged credentials (e.g. personal credentials and group credentials). Since the different sets of privileged credentials may be associated with different types of access, it may be desired to use a specific set.

Optionally, client request 2000 indicates the target service for which the privileged access is required.

Optionally, CMS 204 authenticates the client (and/or user) prior to requesting the PAT.

CMS 204 identifies the target service the client wants to access and the privileged credentials that need to be retrieved.

Optionally, CMS 204 checks that the client (and/or user) is authorized to access the target service and to use a PAT issued using the identified privileged credentials, prior to acquiring the PAT.

Optionally, CMS 204 checks that the client (and/or user) is authorized to request a PAT issued using the identified privileged credentials, prior to acquiring the PAT.

Optionally, CMS 204 uses specified logic to determine the validity of the authentication credentials and/or to check whether the user is authorized to access the target services.

Obtaining Privileged Credentials

Optionally, privileged credentials are retrieved by CMS 204 from one or more of:

i) A credential repository on CMS 204;
ii) A network-connected credential repository (such as a network-connected database or file storage); and
iii) A Privileged Account Management System (PAMS).

Figure 2B:
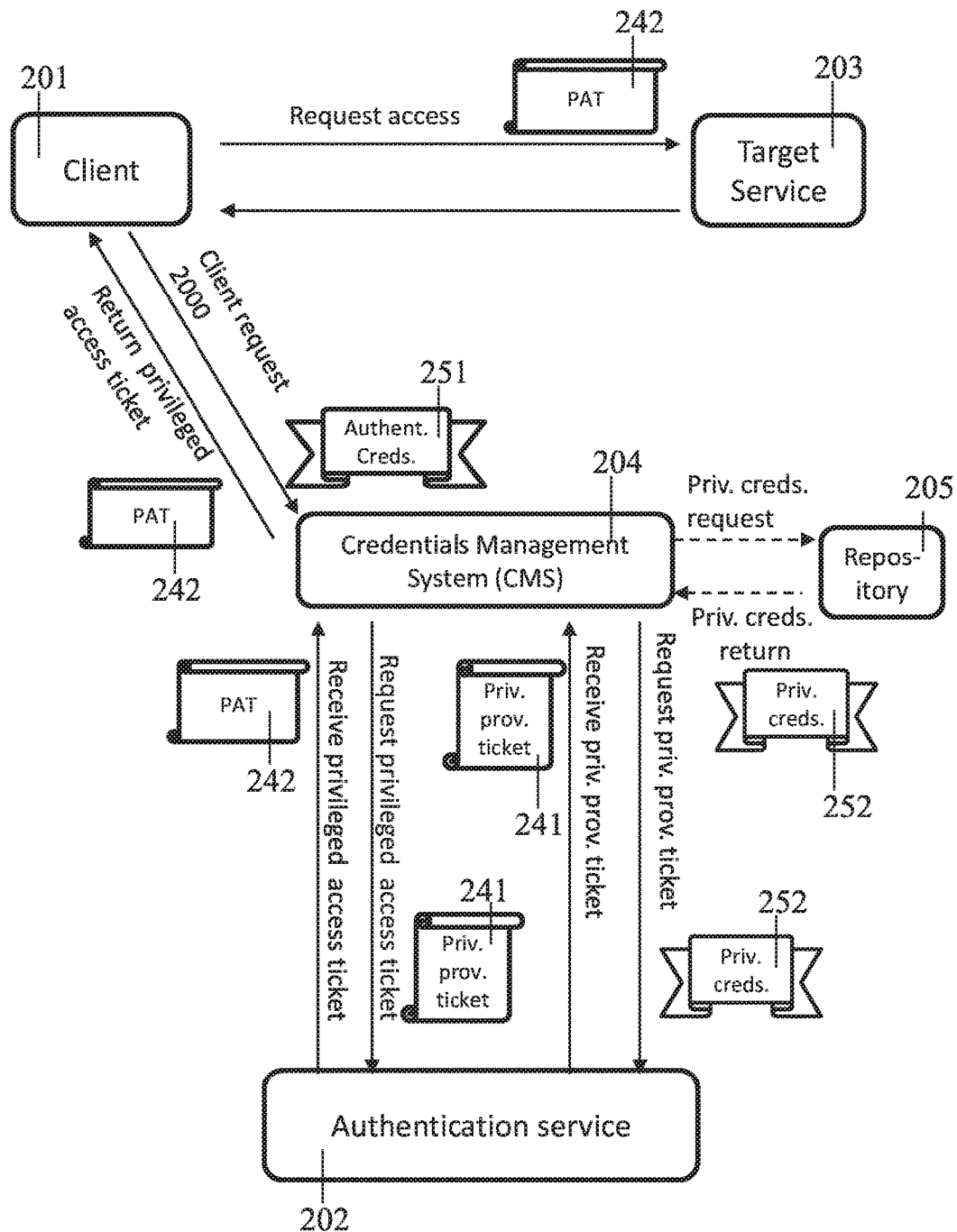
FIG. 2B is a second simplified diagram of a client obtaining a privileged access ticket to a target service using a credentials management system, according to embodiments of the invention.

Additionally or alternately, the privileged credentials are derived by CMS 204 from a local configuration and/or logic. FIGS. 2A-2B show the non-limiting embodiment, in which privileged credentials are retrieved from external credential repository 205.

Optionally, CMS 204 obtains the privileged credentials by providing authentication credentials 251 to a credential management element. The credential management element authenticates the client from the authentication credentials and returns the privileged credentials to CMS 204.

Optionally, the credential management element is a PAMS. A PAMS is a system which manages privileged accounts, access and actions in accordance with organizational policy, mainly by controlling and managing the credentials to privileged accounts (i.e. privileged credentials). The PAMS may include user authentication, mapping of which users are allowed usage of which privileged account and logging of privileged accounts usage. The PAMS may include additional features such as monitoring of actions performed by privileged users. Yet additional features may include support of various workflows, for example managerial approval for password retrieval, correlation with ticketing systems, one-time passwords and password replacement. Thus the PAMS is able to support and enforce organizational policies and procedures for network security and access control. The PAMS may be, for example, a system commercially available as PIM (Privileged Identity Management)/PSM (Privileged Session Management) Suite, from CyberArk® Software Ltd. Petah Tikva, Israel, www (dot)cyberark(dot)com, as modified to serve for credential management as described herein.

In order to authenticate the client and to obtain privileged credentials, CMS 204 provides the authentication credentials to the PAMS. The PAMS provides CMS 204 with the privileged credentials necessary for accessing the target service. Further optionally, the PAMS first determines whether the client has authorization to access the target services and provides the privileged credentials only for authorized target services.

Optionally, the PAMS supports CMS 204 with security and session management functions, such as managing privileged accounts, access to resources and other actions in accordance with organizational policy. These PAMS functions may be performed mainly by controlling and managing the credentials to privileged accounts (i.e. privileged credentials).

Acquiring the PAT

After obtaining privileged credentials 252, CMS 204 acquires a PAT from authentication service 202 using privileged credentials 252. Authentication service 202 provides PAT 242 to CMS 204, optionally after authenticating the CMS 204 using privileged credentials 252.

Optionally, in order to acquire PAT 242, CMS 204 sends a PAT request based on privileged credentials 252 to authentication service 202. Authentication service 202 sends PAT 242 to CMS 204, which in turn forwards PAT 242 to client 201. Client 201 may then access target service 203 using privileged access ticket 242.

Optionally, CMS 204 forwards PAT 242 to the network address from which client request 2000 originated. Additionally or alternately, CMS 204 forwards PAT 242 to a different network address. Thus a user may request a PAT from one user endpoint and access the target service from a different user endpoint.

Obtaining a PAT Using Privileged Credentials and a PPT

Reference is now made to FIG. 2B, which is a second simplified diagram of a client obtaining a PAT to a target service using a credentials management system, according to embodiments of the invention. In some embodiments, CMS 204 is added to the standard three party Kerberos-style authentication. CMS 204 serves as an intermediate between client 201 and authentication service 202.

For clarity, the following describes the non-limiting embodiment in which access to the target service requires privileged credentials not in possession of client 201. Other embodiments are envisioned where access to some target services is not privileged, and the authentication credentials possessed by client 201 are sufficient for accessing a desired target service. In such cases, client 201 may obtain a non-privileged access ticket directly from authentication service 202 without involving CMS 204.

In order to access target service 203, client 201 requests a PAT from CMS 204 and provides authentication credentials 251. CMS 204 uses authentication credentials 251 to retrieve privileged credentials 252. Privileged credentials 252 may be obtained by CMS 204 by any means known in the art.

Optionally, the client request (2000) for a PAT does not specify that accessing the target service requires privileged credentials. In fact, the client (and/or user) may be unaware that access to target service 203 is privileged access which requires privileged credentials.

Optionally, authentication credentials 251 specify or otherwise indicate the privileged credentials to be used by CMS 204 for acquiring the PPT and/or PAT. This may be helpful in cases where a given user or client is associated with more than one set of privileged credentials (e.g. personal credentials and group credentials). Since the different sets of privileged credentials may be associated with different types of access, it may be desired to use a specific set.

Optionally, client request 2000 indicates the target service for which the privileged access is required.

Optionally, CMS 204 authenticates the client (and/or user) prior to requesting the PPT and/or PAT.

CMS 204 identifies the target service the client wants to access and the privileged credentials that need to be retrieved.

Optionally, CMS 204 checks that the client (and/or user) is authorized to access the target service, prior to acquiring the PPT and/or PAT.

Optionally, CMS 204 checks that the client (and/or user) is authorized to request a PAT issued using the identified privileged credentials, prior to acquiring the PAT.

Optionally, CMS 204 uses specified logic to determine the validity of the authentication credentials and/or to check whether the user is authorized to access the target services.

After obtaining privileged credentials 252, CMS 204 acquires a PPT from authentication service 202 using privileged credentials 252. Authentication service 202 provides PPT 241 to CMS 204, optionally after authenticating the CMS 204 using privileged credentials 252.

Optionally, in order to acquire PPT 241, CMS 204 sends a request for a PPT (also denoted herein a PPT request) based on privileged credentials 252 to authentication service 202. CMS 204 then receives PPT 241 from authentication service 202. Similarly, in order to acquire PAT 242, CMS 204 sends a PAT request based on PPT 241 to authentication service 202. CMS 204 then receives PAT 242 from authentication service 202.

After acquiring PPT 241, CMS 204 requests a PAT from authentication service 202. The PAT request includes PPT 241, so that no further authentication of CMS 204 is required. Authentication service 202 sends PAT 242 to CMS 204, which in turn forwards PAT 242 to client 201. Client 201 may then access target service 203 using PAT 242.

Optionally, CMS 204 forwards PAT 242 to the network address from which client request 2000 originated. Additionally or alternately, CMS 204 forwards PAT 242 to a different network address. Thus a user may request a PAT from one user endpoint and access the target service from a different user endpoint.

Optionally, PPT 241 is valid only for the CMS at the network address from which the request for the PPT 241 originated. Additionally or alternately, PPT 241 is forwardable to another machine in the network, such as a second CMS or the user endpoint, so that PAT requests made by the other machine using PPT 241 are considered valid by authentication service 202.

Optionally, after acquiring PPT 241, CMS 204 may use PPT 241 to obtain additional PATs for client 201. Optionally, the additional PAT is for a second access to target service 203. This may be necessary, for example, if access to target service 203 timed out or the original PAT expired.

Optionally, CMS 204 forwards the PPT to the client. Further optionally, client 201 may use the PPT to acquire a PAT directly from authentication service 202. The client may then use the PPT to gain privileged access to target services other than the originally-requested target service.

CMS Location

CMS 204 may reside on any system or network element which enables it to serve as an intermediate between the client and authentication service 202.

Optionally, CMS 204 is distributed over multiple network elements.

Optionally, CMS 204 resides on one or more of:
a) A server between the client and the target services;
b) A server hosting an authentication service;
c) A dedicated machine (physical or virtual) on the communication network;
and
d) A user endpoint on which the client resides.

Optionally CMS 204 communicates with client 201 and/or authentication service 202 over a communication network. Further optionally, CMS 204 communicates with an authentication service 202 distributed over the communication network. For example, privileged provisioning tickets may be acquired from a first network element and privileged access tickets may be acquired from a second network element using privileged credentials and/or a PPT provided by the first network element.

By serving as an intermediary between the client and the authentication service, CMS 204 may facilitate the interaction between client 201 and authentication service 202 (e.g. in cases where client 201 and authentication service 202 operate with different authentication schemes, encryption, network address protocols, etc. . . . ). CMS 204 may also serve as a node for enforcing organizational policy and controlling user privileges.

A. Authentication Schemes

Optionally, client 201 authenticates to CMS 204 using a first authentication scheme, and CMS 204 authenticates to authentication service 202 using a second (i.e. different) authentication scheme. Thus the authentication process (i.e. acquiring the PPT and/or PAT) may be performed even when the client does not support the second authentication scheme.

B. Address Protocols

Optionally, CMS 204 converts address protocols used to identify the target service. The client request (2000) to access a target service specifies an address of the target service in a first address protocol. CMS 204 translates the address of the target service to a second address protocol, and sends PPT and/or PAT requests to authentication service 202, where the target service address is specified in the second address protocol.

For example, Kerberos authentication requires that the target service be specified as a domain name. With CMS address protocol conversion, the client may use specify the target service by IP address and requests sent to the Kerberos authentication system will specify the target service by domain name.

C. Usage Data

Optionally, CMS 204 sends client 201 additional data along with PAT 242. The additional data (denoted herein usage data) indicates privileges and limitations of client access to target service 203, and controls the behavior of a client which is designed to work within the boundaries defined by the usage data. Thus CMS 204 is able to control client access to target service 203 beyond the parameters of the PAT. For example, the usage data may specify particular times of day that the client may access the target service, thus controlling usage of the target service resource by multiple clients.

D. Policy Enforcement

Optionally, CMS 204 enforces a policy on PPT 241 and/or PAT 242. For example, PPT 241 may be flagged by authentication service 202 as renewable, but CMS 204 may itself limit the number of times that the PPT is renewed.

Kerberos-Type Authentication Service

Figure 3A:
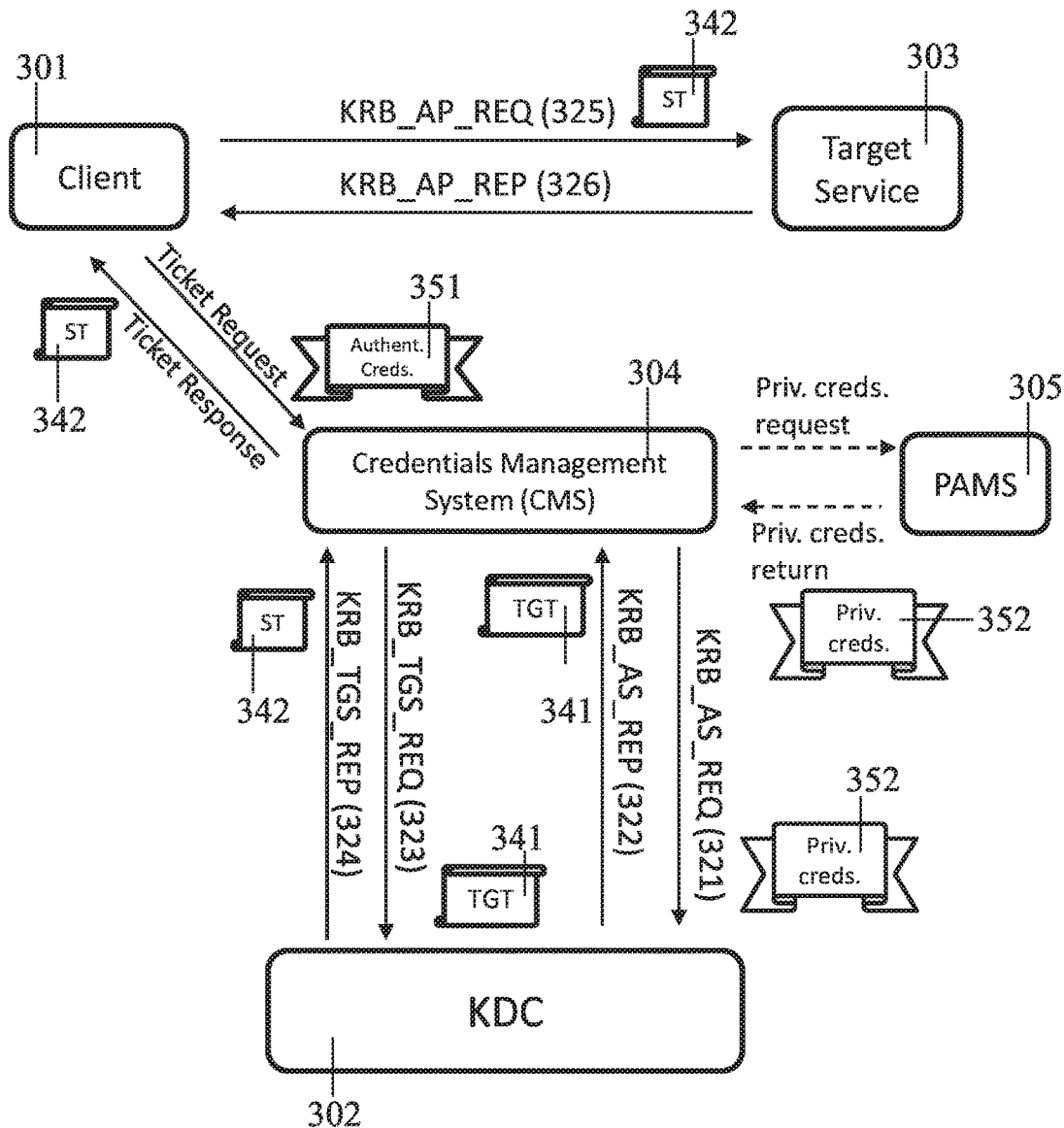
FIG. 3A is a simplified diagram of a client obtaining a privileged service ticket from a Kerberos KDC via a credentials management system, according to exemplary embodiments of the invention.

Reference is now made to FIG. 3A, which is a simplified diagram of a client obtaining a privileged service ticket from a Kerberos KDC via a credentials management system, according to exemplary embodiments of the invention.

In FIG. 3A, the authentication service is a Kerberos KDC 302. The Kerberos messages being communicated over the network are shown along the arrows linking the network elements. It is seen that Kerberos messages 321-324 which are used to acquire TGT 341 and ST 342 are communicated between CMS 304 and KDC 302. This is in contrast with the Kerberos system of FIG. 1 in which these same messages are communicated between client 101 and Kerberos system 102.

SAML-Type Authentication Service

In Security Assertion Markup Language (SAML) the user authenticates to an Identity Provider, receives an authentication token and presents the authentication token to the Service Provider (e.g. the target service). In the context of the instant invention the Identity Provider corresponds substantially to the authentication service and the authentication token corresponds substantially to the PAT.

Figure 3B:
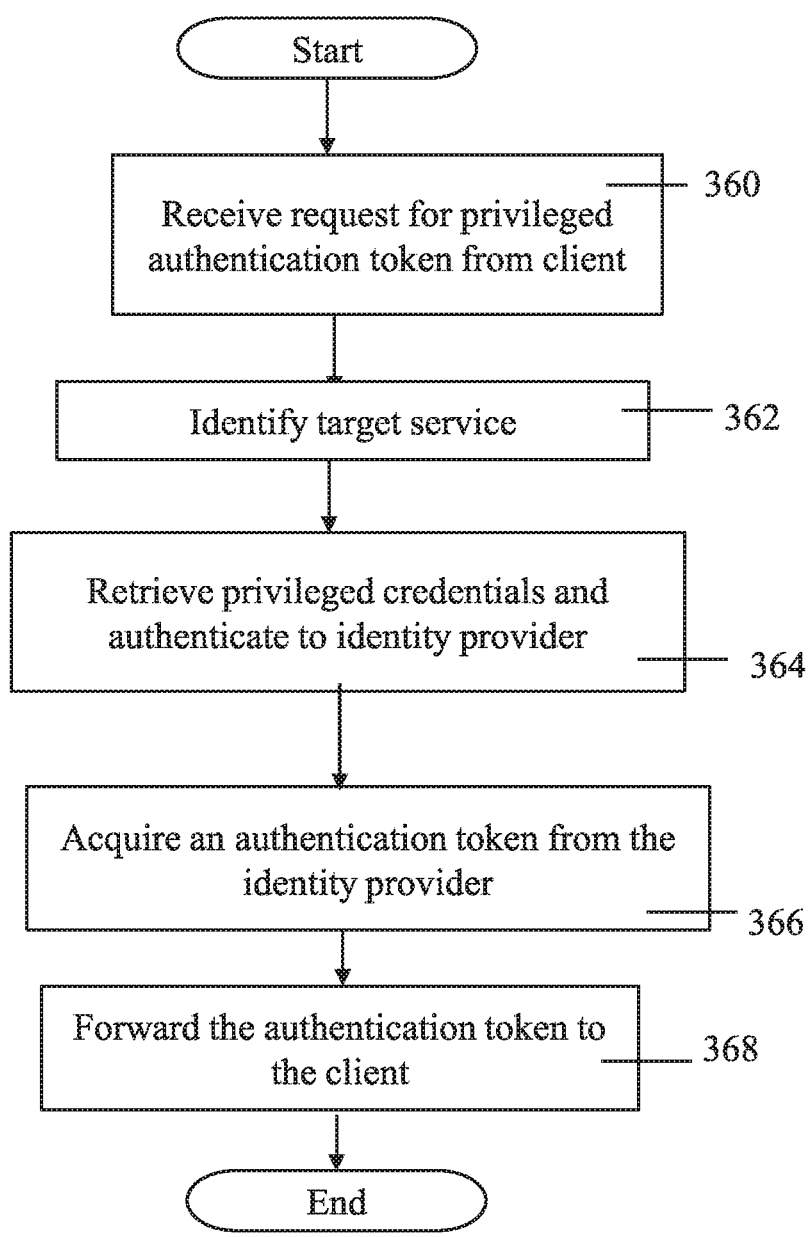
FIG. 3B is a simplified flowchart of a method of providing a client with an authentication token, according to embodiments of the invention.

Reference is now made to FIG. 3B, which is a simplified flowchart of a method of providing a client with an authentication token, according to exemplary embodiments of the invention. The SAML token is obtained by:

In 360 the client requests a privileged authentication token for a target service from the CMS.

In 362 the CMS identifies the target service and the requested privileged credentials.

In 364, the CMS retrieves privileged credentials and uses the privileged credentials to authenticate to the identity provider.

In 366, the CMS receives an authentication token from the identity provider.

In 368, the CMS sends the authentication token to the client.

The user is not in possession of the privileged credentials, therefore only the CMS may use the privileged credentials to authenticate to the Identity Provider.

Authentication Methods

Figure 4A:
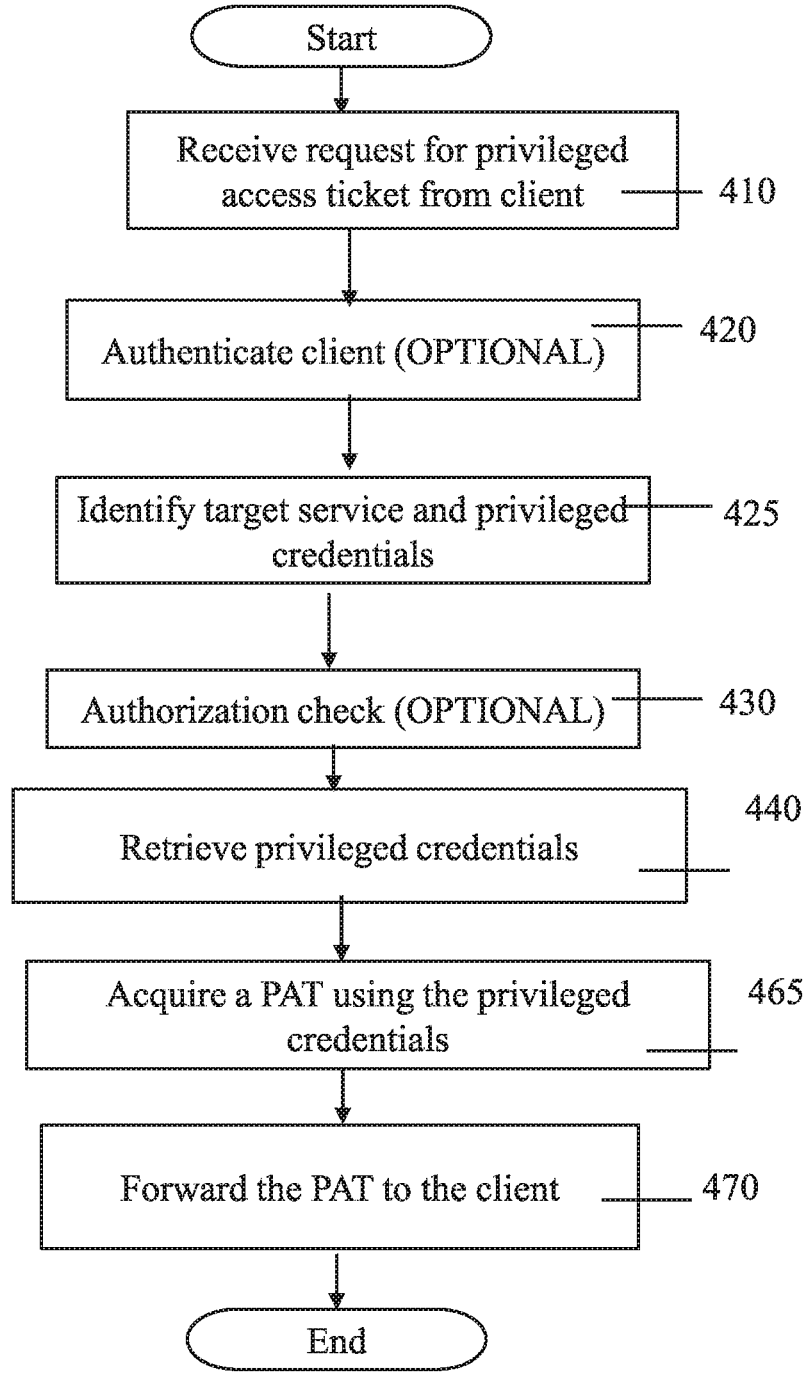
FIG. 4A is a first simplified flowchart of a method of providing a client with a privileged access ticket to access a target service, according to embodiments of the invention.

Reference is now made to FIG. 4A, which is a first simplified flowchart of a method for providing a client with a PAT to access a target service, according to embodiments of the invention. In FIG. 4A the PAT is obtained using the privileged credentials and does not require a PPT.

In 410 the CMS receives a request from a client for a PAT. The client request uses the client's authentication credentials.

Optionally, in 420 the CMS authenticates the client using the authentication credentials.

In 425 the target service and the required privileged credentials are identified.

Optionally the required privileged credentials are identified from one or more of:
  i) The authentication credentials;
  ii) Information in the client request for a PAT;
  iii) Client request parameters (such as IP or time or a specific parameter in the request denoting the requested privileged credentials); and
  iv) Logic on the CMS.

Optionally the target service is identified from one or more of:
  i) The authentication credentials;
  ii) Information in the client request for a PAT;
  iii) Client request parameters (such as IP or time or a specific parameter in the request denoting the requested target service); and
  iv) Logic on the CMS.

Optionally, in 430 the CMS checks the client authorization to access the target service.

In 440, the CMS retrieves the privileged credentials needed to fulfill the client's request.

In 465 the CMS acquires the PAT from the authentication service using the privileged credentials.

In 470 the CMS forwards the PAT to the client.

Figure 4B:
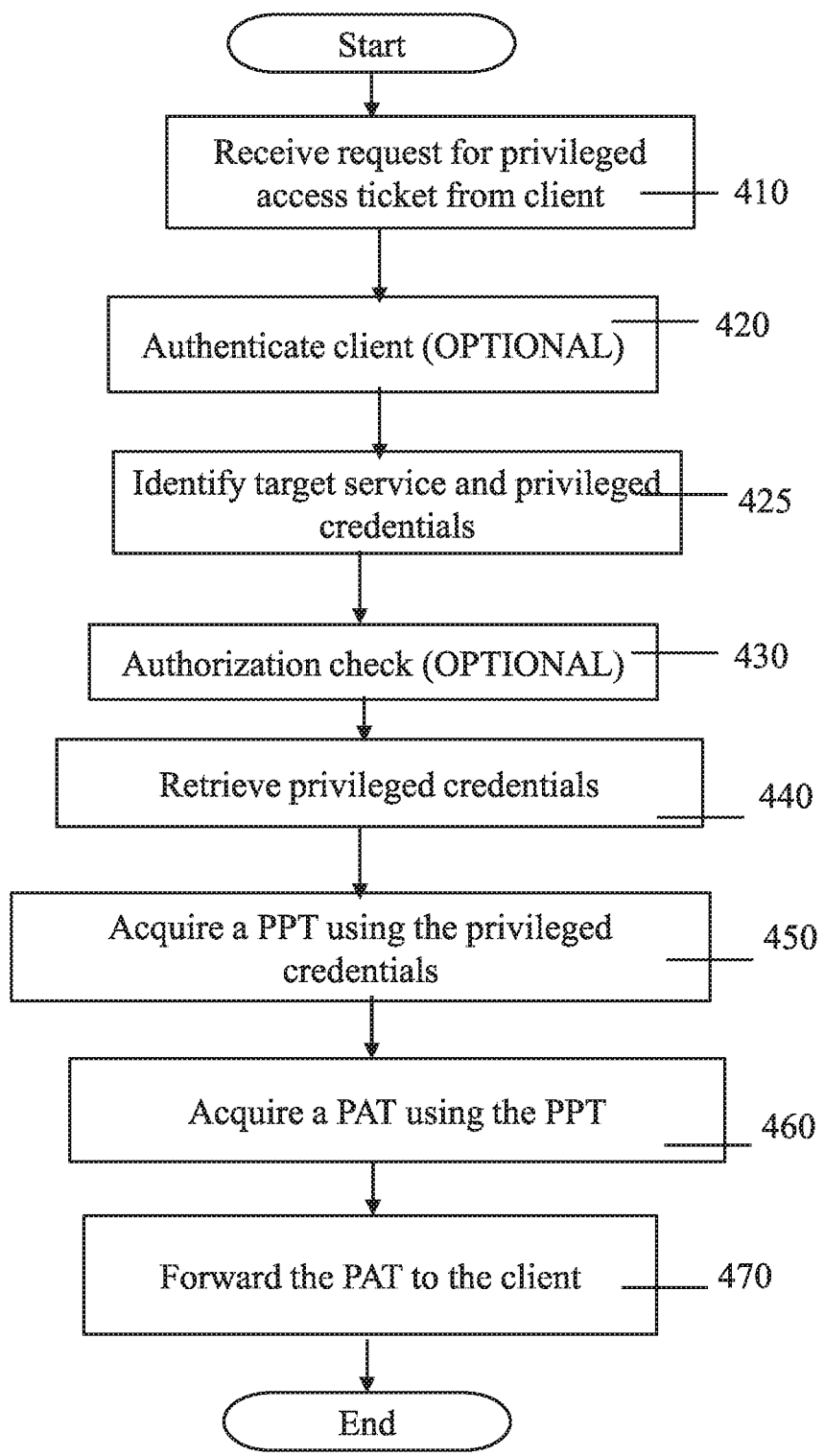
FIG. 4B is a second simplified flowchart of a method of providing a client with a privileged access ticket to access a target service, according to embodiments of the invention.

Reference is now made to FIG. 4B, which is a second simplified flowchart of a method for providing a client with a PAT to access a target service, according to embodiments of the invention. In FIG. 4B the PAT is obtained using the privileged credentials and a PPT.

In 410 the CMS receives a request from a client for a PAT. The client request uses the client's authentication credentials.

Optionally, in 420 the CMS authenticates the client using the authentication credentials.

In 425 the target service and the required privileged credentials are identified.

Optionally the required privileged credentials are identified from one or more of:
  i) The authentication credentials;
  ii) Information in the client request for a PAT;
  iii) Client request parameters (such as IP or time or a specific parameter in the request denoting the requested privileged credentials); and
  iv) Logic on the CMS.

Optionally the target service is identified from one or more of:
  i) The authentication credentials;
  ii) Information in the client request for a PAT;
  iii) Client request parameters (such as IP or time or a specific parameter in the request denoting the requested target service); and
  iv) Logic on the CMS.

Optionally, in 430 the CMS checks the client authorization to access the target service.

In 440, the CMS retrieves the privileged credentials needed to fulfill the client's request.

In 450 the CMS acquires a PPT from the authentication service using the privileged credentials.

In 460 the CMS acquires the PAT from the authentication service using the PPT.

In 470 the CMS forwards the PAT to the client.

In some embodiments, obtaining a PAT is a two-part process. The client first requests that the CMS acquire the PPT. The client request for a PAT may be received by the CMS at a later time, at which time the CMS may continue directly at 460 since it is already in possession of the PPT.

Credentials Management System

Figure 5:
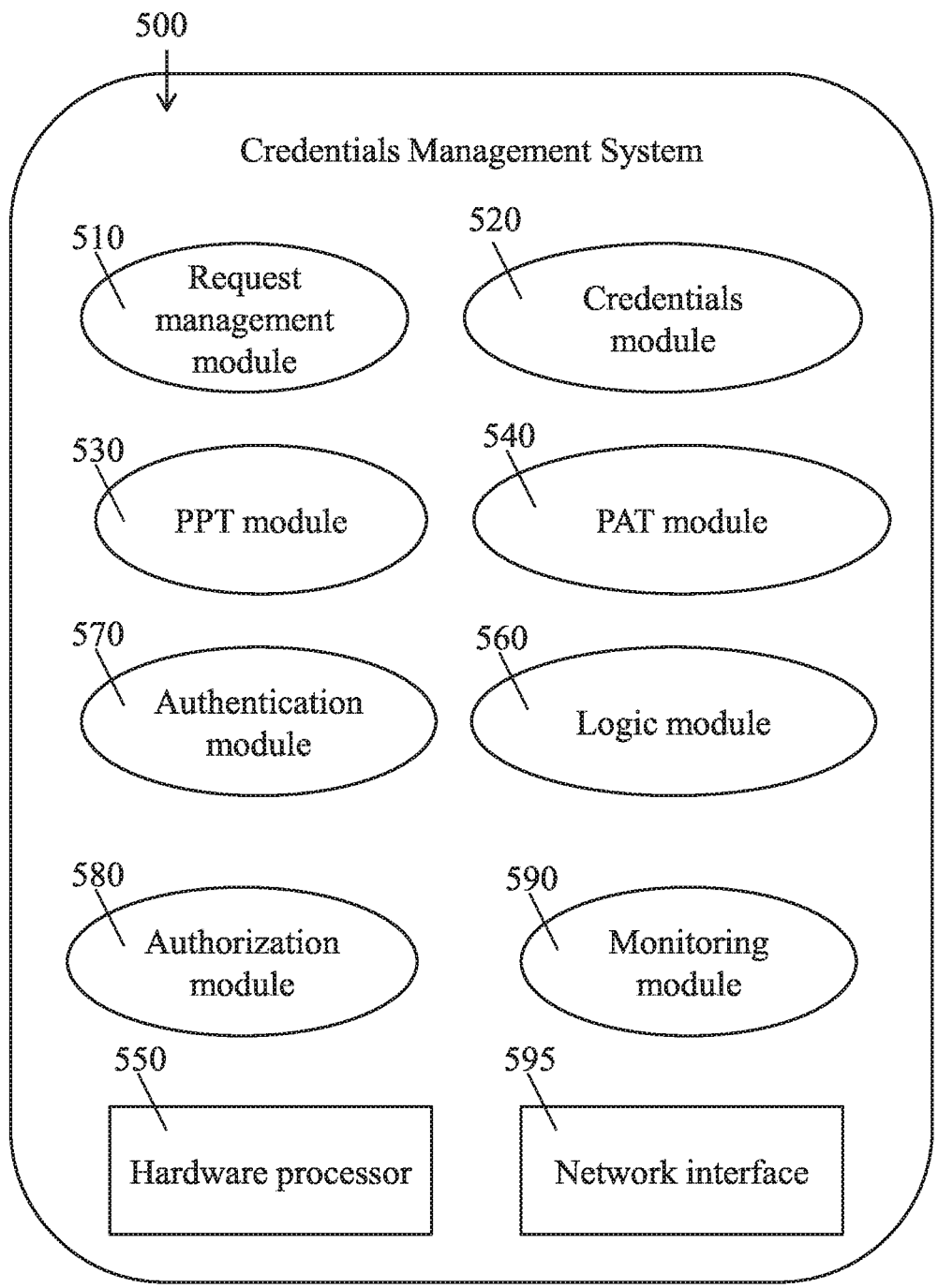
FIG. 5 is a simplified block diagram of a credentials management system, according to embodiments of the invention.

Reference is now made to FIG. 5, which is a simplified block diagram of a credentials management system according to embodiments of the invention.

CMS 500 includes:

i) Request management module 510;

ii) Credentials module 520;

iii) Privileged access ticket (PAT) module 540; and iv) Hardware processor 550 which performs hardware processing operations.

As used herein, the term credentials management system is not intended to be limited to a system in which modules are distributed over multiple computing machines. Optionally, all of the modules described herein are included in a single computing machine (e.g. server or endpoint).

Request management module 510 receives requests from clients for privileged access tickets. The request includes respective authentication credentials for the client.

Credentials module 520 retrieves privileged credentials using the authentication credentials provided with the client PAT request. Optionally, credentials retrieval module 520 retrieves the credentials from a PAMS which authenticates the user prior to providing privileged credentials to the CMS.

PAT module 540 acquires PATs. PAT module 540 requests the PAT from the authentication service. Optionally, the PAT request includes a PPT required for acquiring the PAT. When the PAT is acquired, PAT module 540 forwards the PAT to the client. The PAT enables the client to access the target service.

CMS 500 optionally includes one or more of the following modules:

i) Privileged provisioning ticket (PPT) module 530 acquires PPTs. PPT module 530 sends PPT requests to an authentication service using respective privileged credentials. PPT module 530 also receives PPTs returned by the authentication service in response to the respective PPT request;

ii) Logic module 560—stores the configuration and operation logic (and/or contains instructions for hardware processor 550) required to acquire PPTs and/or PATs. Optionally, logic module 560 includes logic for identifying which target service the client wants to access. The identification may be based on the authentication credentials used by the client and/or request parameters (such as IP or time or a specific parameter in the request denoting the requested target service). Optionally, logic module 560 includes logic for identifying which privileged credentials to retrieve. The identification may be based on the authentication credentials used by the client and/or request parameters (such as IP or time or a specific parameter in the request denoting the required privileged credentials);

iii) Authentication module 570—authenticates the client request for a PAT;

iv) Authorization module 580—determines whether the client is authorized to access the target services and ensures that privileged credentials are retrieved and used only for authorized target services. Additionally or alternatively, authorization module 580 determines whether the client is authorized to request a PAT issued using the previously identified privileged credentials;

v) Monitoring module 590—audits activity on the CMS (e.g. requests, responses, etc. . . . ); and vi) Network interface 595—communicates with at least one client and/or authentication service over a communication network.

Client Agent

In some embodiments the user endpoint hosts an agent that controls the authentication process required to obtain a PAT from the client side. The agent may be incorporated into the client or run as an independent entity which intercepts client communication related to the process of obtaining a PAT.

Optionally the agent:

a) Intercepts and/or receives a PAT request from the client to communicate with a target service;

b) Sends a request to the CMS for a PAT and/or PPT for a specific target service;

c) Authenticates with the authentication credentials on behalf of the client; and d) Provides the PAT to the client.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant clients, user endpoints, servers, credential types, credential management, account management, authentication services, protocols, tickets and target services will be developed and the scope of the term client, endpoint, server, credential, credential management, account management, authentication service, protocol, ticket and target service is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A credentials management system for managing credentials for use in an authentication protocol, comprising:
    at least one hardware processor configured to:
        determine that a client requires a specific permission to access a target service according to the authentication protocol;
        identify, based at least in part on the determination, a credential accessible to the credentials management system, the identified credential being associated with the client but not accessible to the client;
        communicate with an authentication service using the identified credential to obtain an authenticator on behalf of the client based on the identified credential;
        receive the authenticator from the authentication service, responsive to the authentication service authenticating the credentials management system based on the identified credential; and
        send the authenticator to the client thereby enabling use of the authenticator by the client for client operations with the target service.

2. The credentials management system of claim 1, wherein the authentication protocol is a security assertion markup language protocol.

3. The credentials management system of claim 1, wherein the authentication protocol is a Kerberos protocol.

4. The credentials management system of claim 1, wherein the determination that the client requires the specific permission to access the target service is based on a request from the client.

5. The credentials management system of claim 4, wherein the request from the client does not specify that the client requires the specific permission to access the target service.

6. The credentials management system of claim 1, wherein the at least one hardware processor is further configured to authenticate the client before obtaining the authenticator.

7. The credentials management system of claim 1, wherein the at least one hardware processor is further configured to determine whether the client is permitted to access the target service before obtaining the authenticator.

8. The credentials management system of claim 1, wherein the at least one hardware processor is further configured to specify limitations for the client's ability to access the target service using the authenticator.

9. The credentials management system of claim 1, wherein the authenticator is an access token.

10. The credentials management system of claim 1, wherein the authenticator is an authentication ticket.

11. A computer-implemented method for managing credentials for use in an authentication protocol, the method comprising:
    determining that a client requires a specific permission to access a target service according to the authentication protocol;

identifying, based at least in part on the determination, a credential accessible to the credentials management system, the identified credential being associated with the client but not accessible to the client;

communicating with an authentication service using the identified credential to obtain an authenticator on behalf of the client based on the identified credential;

receiving the authenticator from the authentication service, responsive to the authentication service authenticating the credentials management system based on the identified credential; and sending the authenticator to the client thereby enabling use of the authenticator by the client for client operations with the target service.

12. The computer-implemented method of claim 11, further comprising monitoring communications activity between the client and the target service.

13. The computer-implemented method of claim 11, further comprising determining whether, after forwarding the authenticator to the client, the authenticator is still valid.

14. The computer-implemented method of claim 13, further comprising determining whether to obtain a new authenticator for the client.

15. The computer-implemented method of claim 11, wherein the determining that the client requires the specific permission to access the target service is based on receiving a request from the client to access the target service.

16. The computer-implemented method of claim 15, wherein the request includes a network address corresponding to the target service.

17. The computer-implemented method of claim 11, wherein the specific permission is a privileged permission of the client.

18. The computer-implemented method of claim 11, wherein the specific permission is a non-privileged permission of the client.

19. The computer-implemented method of claim 11, wherein there are a plurality of credentials associated with the client, each of the plurality of credentials being associated with a different set of access rights for the client to the target service.

20. The computer-implemented method of claim 19, further comprising identifying the credential, from the plurality of credentials, based on at least one of: an authentication credential provided by the client or information from a request provided by the client.

* * * * *